United States Patent [19]

Rohrer et al.

[11] Patent Number: 5,085,377
[45] Date of Patent: Feb. 4, 1992

[54] PROCESS FOR FEEDING PAPER ROLLS TO WEB-FED ROTARY PRESSES AND DEVICE FOR CARRYING OUT THE PROCESS

[75] Inventors: Jean Rohrer; Ernst Lehmann, both of Bern, Switzerland

[73] Assignee: Maschinenfabrik WIFAG, Wylerringstrasse, Switzerland

[21] Appl. No.: 503,385

[22] Filed: Mar. 30, 1990

[30] Foreign Application Priority Data

Mar. 31, 1989 [DE] Fed. Rep. of Germany ....... 3910444

[51] Int. Cl.⁵ .......................................... B65H 19/12
[52] U.S. Cl. .................... 242/58.6; 414/273; 414/911
[58] Field of Search ................ 242/58.6, 57, 79; 414/273, 911

[56] References Cited

U.S. PATENT DOCUMENTS

| 3,599,890 | 8/1971 | Atherton et al. | 242/79 |
| 4,679,149 | 7/1987 | Merz | 414/273 X |
| 4,708,300 | 11/1987 | Goetz | 242/58.6 X |
| 4,752,176 | 6/1988 | Linder | 242/58.6 X |
| 4,863,335 | 9/1989 | Herigstad et al. | 414/911 X |
| 4,932,828 | 6/1990 | Katae et al. | 414/273 X |
| 4,948,060 | 8/1990 | Kurz et al. | 242/58.6 X |

*Primary Examiner*—John M. Jillions
*Attorney, Agent, or Firm*—McGlew & Tuttle

[57] ABSTRACT

Process for feeding paper rolls for supplying web-fed rotary presses with paper rolls and for disposing of remnants from web-fed rotary presses, comprising a control system, which stores data on the location and the type of all paper rolls and disposal containers at any point in time. The system is designed to be so redundant such that partially manual or completely manual operation is possible in the case of failure of one or several components, as a result of which printing of the jeopardized publication is possible even in case of emergency, and the safety and ergonomic aspects are also not neglected even in an emergency situation.

19 Claims, 7 Drawing Sheets

PROCESS FOR FEEDING PAPER ROLLS TO WEB-FED ROTARY PRESSES AND DEVICE FOR CARRYING OUT THE PROCESS

FIELD BACKGROUND OF THE INVENTION

The present invention pertains to a process for feeding paper rolls to web-fed rotary presses in which each paper roll is brought to a main roll stock room used for long-term storage to a roll stand of the web-fed rotary press by means of a paper roll conveying system and to a device for carrying out such a process.

The supply of the web-fed rotary presses with paper rolls must be planned very carefully in order to feed the correct paper rolls to the roll stands at a given time. This is especially true in newspaper printing shops. High requirements in terms of reliability, safety, and economics are imposed on the organization of the corresponding "roll cellar". In addition, especially the weight of such a paper roll, the time pressure, and the basic requirement that each edition must be published completely and in time must be taken into account.

It is now a common practice to supply web-fed rotary presses with paper rolls so that, e.g., in the case of a daily paper, the paper rolls are deposited during the day in predetermined places in a so-called intermediate roll stockroom. The paper rolls are then brought, during the night, when printing is carried out, to the roll stands, using, if needed, material handling means, e.g., a trackbound cart. At the roll stand, the rolls are unpacked and prepared manually for automatic bonding. For economic reasons, special unpacking and bonding area preparation stations are currently increasingly arranged in front of the roll stands. The replacement of the nearly used-up roll with the fresh roll, as well as the bonding and consequently the adaptation of the new paper roll fed into the paper web, which passes through the web-fed rotary press, are carried out in the roll stand itself. The residual roll that is nearly used up is removed from the roll stand and disposed of. To avoid blocking of the supply routes, a separate disposal route is usually provided.

In the roll cellar systems described previously, trouble-free operation of the web-fed rotary presses depends especially on the quality of the manual work performed by an operator. Errors made by the operator during the feeding in or the preparation of bonding areas can lead to rather long downtimes. In addition, the handling of the heavy paper rolls can be associated with relatively heavy physical strain.

An automatic roll cellar was therefore designed and put into operation at the Tokyo daily ASAHI SHIMBUN. The basic requirement is, however, to make the roll size and the paper grade uniform, i.e., only paper rolls of one size with identical packaging are processed.

This roll cellar system will be explained on the basis of FIG. 1 below.

The roll cellar shown in FIG. 1 has a main stockroom A, an auxiliary stockroom B, and a roll stand room C. In this roll cellar system, identical paper rolls P are conveyed via a feed station 1 and a freight elevator 2 from a road-level paper roll receiving station into the roll cellar and are fed into the main stockroom A via a conveyor belt 3. Turntables 4, which serve to adjust the direction of rolling, are provided along the conveyor belt 3. The paper rolls P are pushed off the conveyor belt 3 with pushing devices 5 and are thus loaded into the sloping main stockroom A. Said main stockroom A has oblique guide tracks with buffer members 6, which are provided to decelerate the paper rolls P rolling off. The buffer members 6 are arranged at defined spaced locations. A second conveyor belt 3' brings the paper rolls to a loading station 7 as needed, where unmanned material handling vehicles 7a (AGVs) are automatically loaded with the paper rolls. The unmanned material handling vehicles 7a with the rolls travel in a loop along a path defined by a guide loop 8 through the entire roll stand room C in order to unload the needed paper rolls P at a web-fed rotary press to be supplied. Both the unpacking and the bonding area preparation are performed by robots. The disposal of the roll remnants 9 from the roll stands is also performed automatically by robots 9a.

Because the material handling vehicles 7a are able to travel in one direction only, there are long travel times and a large space is required. In addition, because of the preparation robots used, this system can be used only if the paper roll size is uniform and the packaging is identical. This system is unsuitable for a printing shop outfitted according to European standards, where different roll widths and roll diameters as well as different paper grades are used.

Furthermore, no controlled emergency operation is possible with this roll cellar system, partly because the conveying distances that must be traveled with the unmanned transport carts are very long and partly because the personnel have no experience with the steering of the loaded and empty unmanned material handling vehicles. Malfunctions would inevitably lead to a greatly reduced press run or to stoppage of the printing operation. Finally, the main stockroom A is able to work only according to the "first in first out" principle.

SUMMARY AND OBJECTS OF THE INVENTION

It is the object of the present invention to avoid the disadvantages of this prior-art roll cellar system particularly by providing a process for feeding paper rolls and a device for carrying out the process proposed which can be operated in a very small space, flexibly, and reliably. A plant designed according to the inventive process is flexible in terms of the roll types that can be processed, the use of manpower in the day and night shifts, and the degree of automation, which can be adapted as desired according to the state of the art. In addition, a plant designed according to the inventive process can be operated, depending on the degree of outfitting, manually or automatically, practically as desired, as a result of which the production output is guaranteed at a high degree of reliability.

In all cases in which operating personnel is used, safety and economics can be sufficiently taken into account.

According to the invention the process and device are provided for feeding paper rolls to web-feed rotary presses, in which each paper roll is brought from a main stockroom, used for long-term storage, to a roll stand of the web-fed rotary press. The process comprises providing a plurality of sites at an intermediate roll stockroom and conveying rolls from a main roll stockroom to the intermediate roll stockroom via a first conveying means and moving paper rolls from the first conveying means at a zone of action of a second conveying means to freely selectable ones of said sites via the second conveying means. Prior to reaching the zone of action of the second conveying means, information provided in the form of indicia on each paper roll is read by a data acquisition device for managing the disposition of the paper roll in accordance with the roll weight, the basis weight, the paper grade and the degree of preparation of the roll. The paper roll is subsequently transferred by the second conveying means from the selected site of the intermediate roll stockroom to a roll cart system. The roll is then moved by the roll cart system to either an unpacking and bonding preparation area station or to a roll stand.

Consequently, paper rolls, which are provided with a machine-readable code, which contains information on the roll or paper size, as well as the paper grade, are processed according to the present invention. These paper rolls are fed into a main roll stockroom. A material handling system controlled by a control system brings the desired paper roll from the main roll stockroom into the intermediate roll stockroom. The paper rolls are taken over there by a second material handling system with freely selectable access to the sites of the intermediate roll stockroom and stored. A control system stores information on the paper roll (dimensions, paper grade) and the place where the paper roll has been deposited in the intermediate roll stockroom, e.g., via a barcode reader. From the intermediate roll stockroom, the paper rolls are transferred by the second material handling system to a third material handling system, which is, in particular, a straight and fully automatically controllable track-bound roll cart system. The paper rolls are subsequently fed to the roll stands by means of this track-bound roll cart system. The roll stand of a rotary press is fed by a lifting device controlled by the control system. The unloading of the roll cores or roll remnants is also performed automatically by this lifting system. Unpacking and bonding area preparation stations for removing the external wrapping of the paper rolls and for preparing the bonding areas, as well as roll stand buffer places can be arranged along the path of movement of the paper rolls. If certain operations are not to be performed fully automatically, it is advantageous to provide the unpacking and bonding area preparation stations and the disposal stations along the path of the unmanned material handling system in front of the roll stands.

The process proposed can be automated, in principle, as highly as desired. Depending on the space available and the space requirement of the automatic units of the unpacking and bonding area preparation stations, it may be advantageous to arrange these automatic units in the area of the intermediate roll stockroom rather than in front of the roll stands.

In terms of flexible use, three process variants are possible with the process according to the present invention. Thus, the rolls stored in the intermediate stockroom can be prepared during the night shift and subsequently fed directly to the roll stands. However, roll preparation during the day shift and subsequent intermediate storage is also possible, in which case the prepared rolls are fed from the intermediate stockroom to the roll stands without preparatory operations during the night shift. The roll stands can also be fed with rolls prepared in front of the intermediate roll stockroom. If no production or only reduced production is planned during the shift in which the rolls are prepared, it would also be possible to prepare the rolls in the roll stands, so that it would be possible to eliminate specific unpacking and bonding area preparation stations altogether.

To reuse paper rolls not run off completely in the roll holders, i.e., partially consumed rolls, these must be returned to the intermediate roll stockroom. To make this possible, the existing control system, which still has the rolls to be returned in memory, sends the rolls in question to the third material handing system, where the rolls are subsequently deposited in the intermediate roll stockroom.

If the partially consumed rolls are temporarily removed from the system, it is possible to provide the rolls with a barcode label that is dispensed at the corresponding roll stand. This label can be detected by a corresponding barcode reader when the roll re-enters the system.

To render the management of the entire roll feed, including intermediate storage, more reliable, it is advantageous to compose the control system of at least two simultaneously operating, electronic computers, which are able, individually and independently of each other, to control the process. The probability of total failure is further reduced by this redundant control system.

Since each component requires a subcontrol system and, e.g., electric drive motors for carrying out the process according to the present invention, it is advantageous to design all the components that are needed for carrying out this process so that manual operation of the components is still possible in the case of an emergency. For example, the roll carts are able to deliver paper rolls from the intermediate roll stockroom to the roll stands both automatically and driven by human physical force.

To further increase the reliability of the process according to the present invention, a zone that can be traveled on, which makes it possible to use additional means, e.g., external vehicles, in case of emergency or malfunctions, is arranged according to a preferred embodiment between the intermediate roll stockroom and the unpacking and bonding area preparation stations adjoining it.

The process according to the present invention allows access to any type of paper roll at any point in time. This possibility is an absolute necessity for the western market (aside from Japan), because more than ten different types of paper roll are often used in many printing shops.

Stacker trucks in combination with an overhead crane, which make it possible to grasp the paper rolls gently and to deposit them in nearly any desired position, can be advantageously used as the equipment for the intermediate roll stockroom.

To handle the paper rolls located in the intermediate roll stockroom, which had been provided with the necessary bonding zones, with due care during handling, the second material handling system, especially a crane, can grasp the rolls either on the circumference, using fork type graspers, or at the front end, using spindles on the roll core.

The devices for reading the code applied to the paper rolls are advantageously arranged in front of the intermediate roll stockroom.

The central disposal of the paper remnants generated in the roll cellar should be located within the action zone of the crane of the intermediate roll stockroom, so that the remnants can also be disposed of via the supply routes.

The various features of novelty which characterize the invention are pointed out with particularity in the claims annexed to and forming a part of this disclosure.

For a better understanding of the invention, its operating advantages and specific objects obtained by its uses, reference is made to the accompanying drawings and descriptive matter in which preferred embodiments of the invention are illustrated.

DETAILED DESCRIPTION OF THE PREFERRED EMBODIMENT

Figure 1:
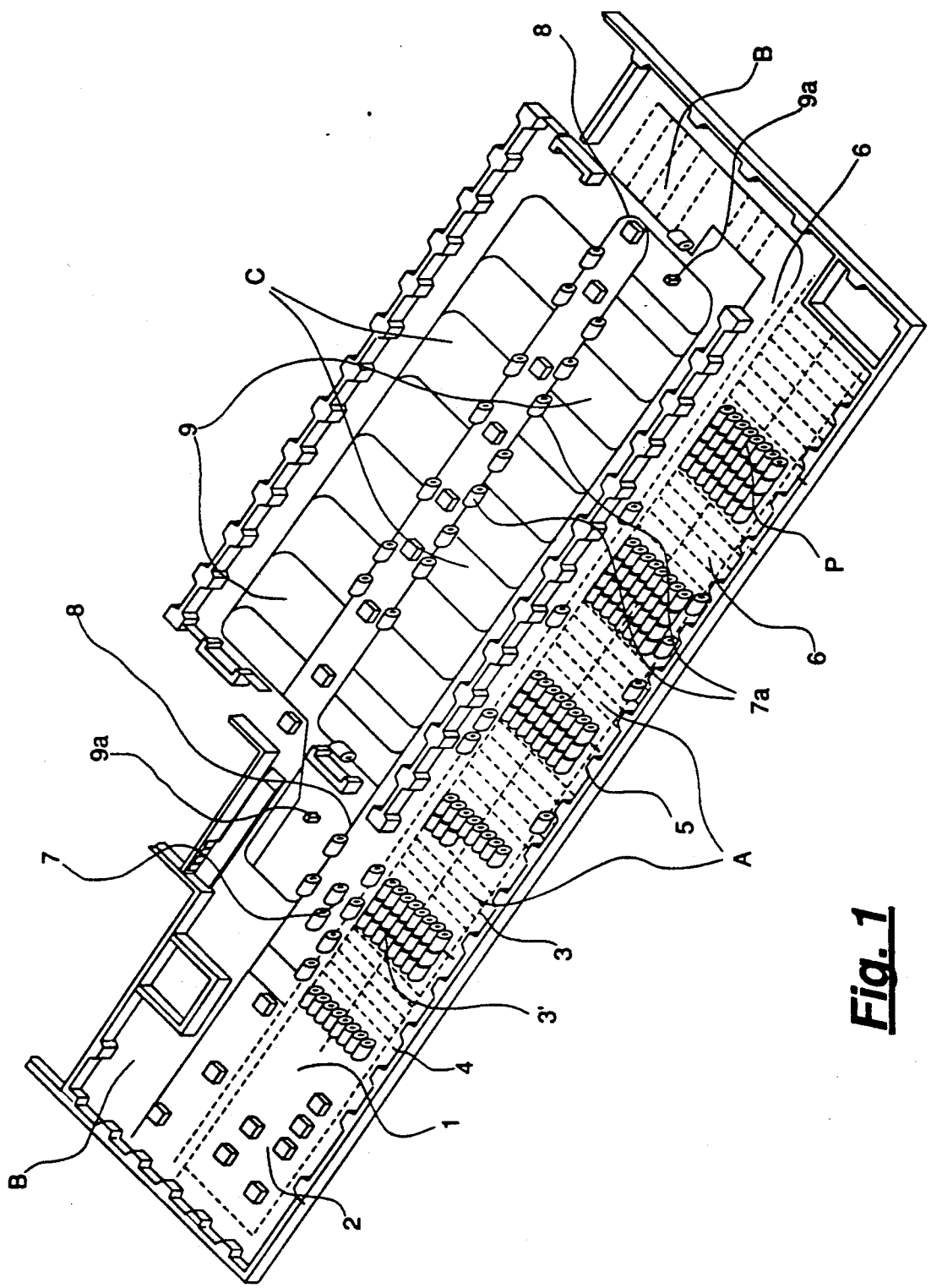
FIG. 1 is a schematic perspective top view of a roll cellar according to the prior art.
Figure 2:
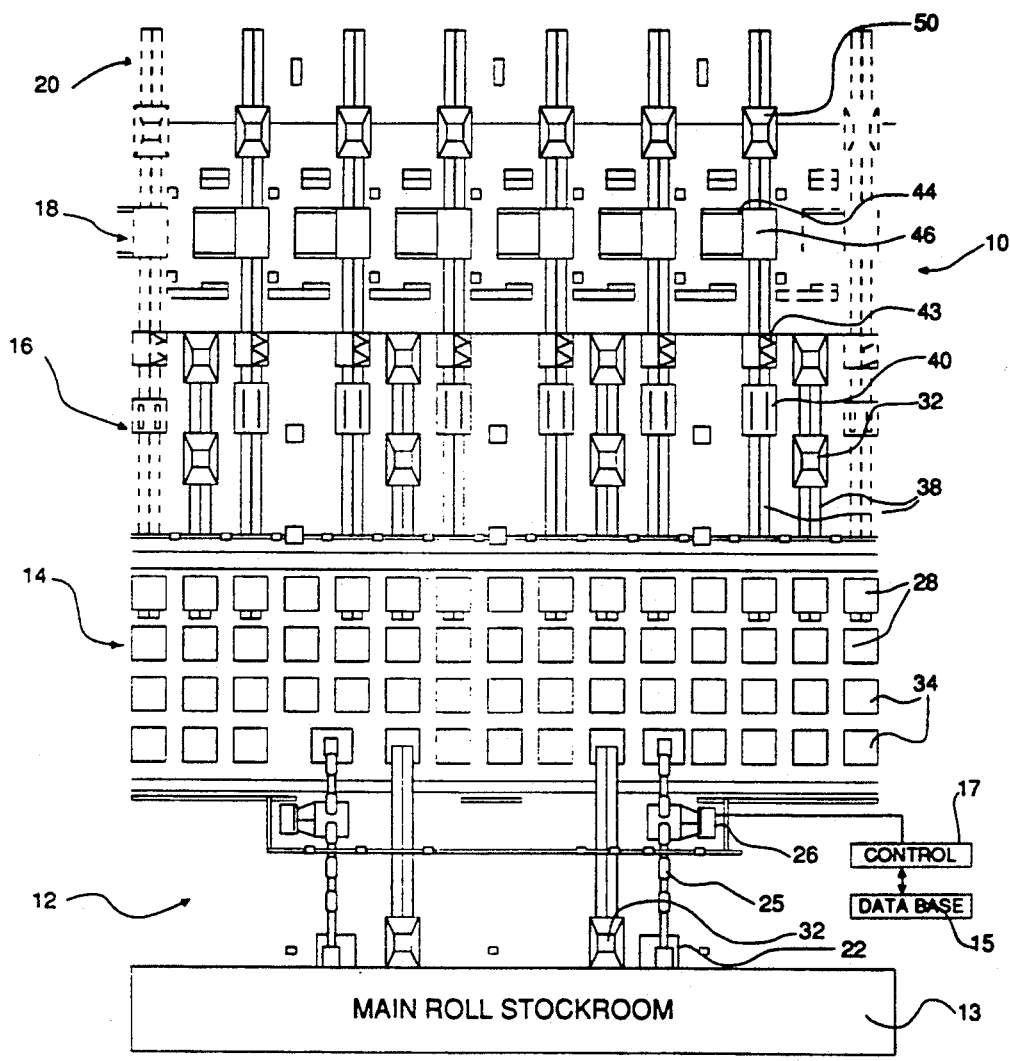
FIG. 2 is a schematic top view of a roll feed room for carrying out a preferred variant of the process of the invention.

The roll feed room generally designated by reference numeral 10 in FIG. 2 has a total of five component areas. The first area 12 is used to unload the paper rolls 28 from the main roll stockroom 13 into the intermediate roll stockroom 14, which forms the second area The first area 12 contains at least one feed station 22 with a stacker truck (not shown).

This stacker truck lifts the paper rolls 28 onto a conveyor belt 25, which conveys the paper rolls 28 past a barcode reader 26 to a place where the paper rolls 28 are transferred into the intermediate roll stockroom 14. At least one disposal station 32 is provided in this area for remnant disposal.

Figure 4:
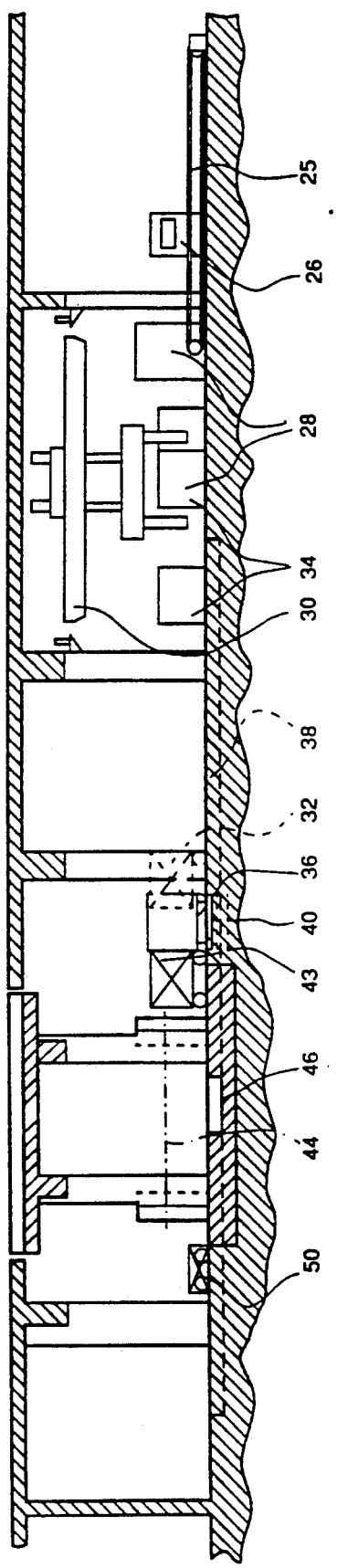
FIG. 4 is a sectional view through the roll feed room according to FIG. 2.

In the intermediate roll stockroom 14, the paper rolls 28 are deposited with a crane 30 (FIG. 4) at exactly defined sites 34, whose locations are monitored and stored in a data base memory 15 by the central control system 17. From there, the paper rolls 28 are unloaded as needed by a crane 30 (FIG. 4) onto unmanned roll carts 36 (FIG. 4). The paper rolls 28 are delivered by the roll carts 36 (FIG. 4) over short rail sections 38 to the unpacking and bonding area preparation stations 40. The roll carts 36, the rail sections 38, and the unpacking and bonding area preparation stations 40 belong to the third area 16 of the roll feed room 10. Buffer sites 43 are also arranged in this, third area 16. Here, the rolls prepared with bonding areas on them are in the waiting position, after the packaging as well as damaged paper has been removed and the bonding areas has been prepared in the unpacking and bonding area preparation stations 40.

Once these technological operations are completed, the paper rolls 28 can be transferred into the fourth area 18.

In the fourth area 18, the prepared paper rolls are transported on the roll carts 36 to the lifting devices 46, which lift the paper rolls, whose weight sometimes reaches one ton, into a predetermined place of the individual roll stands 44 at the different printing presses.

The same lifting device 46 also removes the roll remnant cores after the paper has been used up and delivers the cores via an extension of the rail section 38 into the fifth area 20, which contains the roll remnant disposal stations 50.

Most of the aforementioned steps can take place fully automatically. This leads to continuous and efficient operation, which is monitored and controlled by a central control system 17 which may be connected to the barcode reader 26 and each of the first conveying means 25, the second conveying means 30 and the roll cart system 38 or 39. However, the roll feed room 10 also permits emergency operation due to the redundant design of all the components of areas 12, 14, 16, 18, and 20, so that the operator is able to operate these components manually, so that printing can be continued.

The remnants in the disposal containers 32 can be sent via the rail sections 38 and the crane 30 into area 12 for disposal in a decentralized manner. The disposal containers are subsequently returned on the same route to their starting position.

Figure 3:
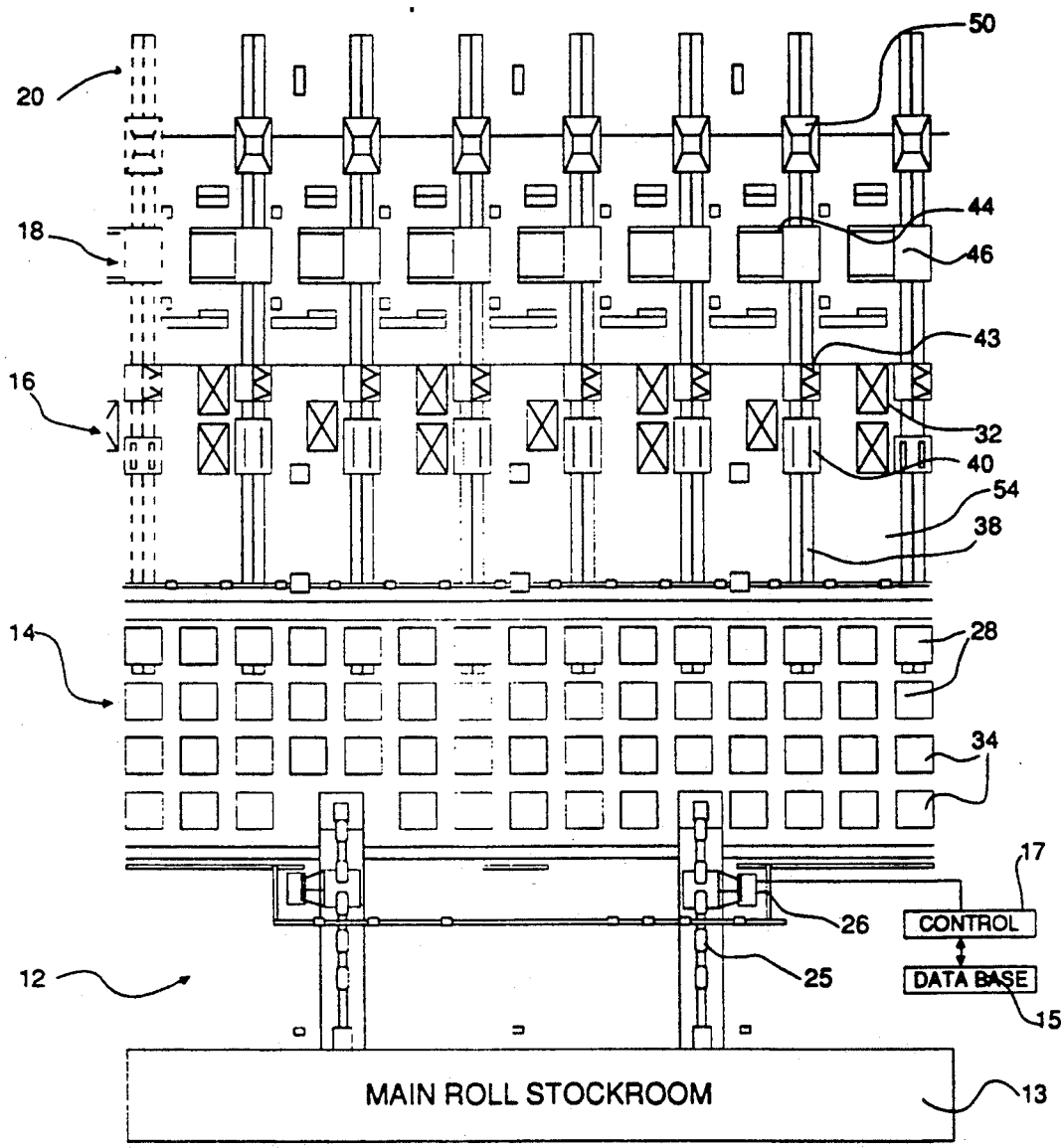
FIG. 3 is a schematic view showing a modification of the process variant according to FIG. 2.

The roll feed room for carrying out the process, which is shown in FIG. 3, differs from the roll feed room 10 according to FIG. 2 only in that an additional zone 54 that can be traveled on is provided, which improves access.

The cross section of the roll feed room 10 according to FIG. 2, which is shown in FIG. 4, shows the conveyor belt 25, which is loaded with paper rolls 28 at the feed stations 22 (not shown here) by means of stacker trucks (also not shown here), and the paper rolls 28 are subsequently conveyed past the barcode reader 26 and into the action zone of the crane 30. Here, the crane 30 takes up the paper rolls to deposit them in predetermined unloading sites 34. The paper rolls are removed from the unloading sites 34 as needed by the crane 30 in a computer-controlled manner and placed on roll carts 36, which subsequently transport the paper rolls 28 along the rail section 38 to the unpacking and bonding area preparation stations 40. These stations are provided with traveling remnant disposal stations 32 to receive the remnants generated during the unpacking and bonding area preparation operations. The completely prepared paper rolls 28 are subsequently conveyed to the roll stands 44. This again is carried out with the roll carts 36 and the rail sections 38. The paper rolls 28 are subsequently placed into the brackets of the roll stand by means of the lifting device 46. The used-up paper rolls or the roll remnants are lifted out of the brackets, which thus become free, by the same lifting device 46. These roll remnants are then transported with the roll carts 36 along the rail section 38 to the roll remnant disposal station 50 and deposited there.

Figure 5:
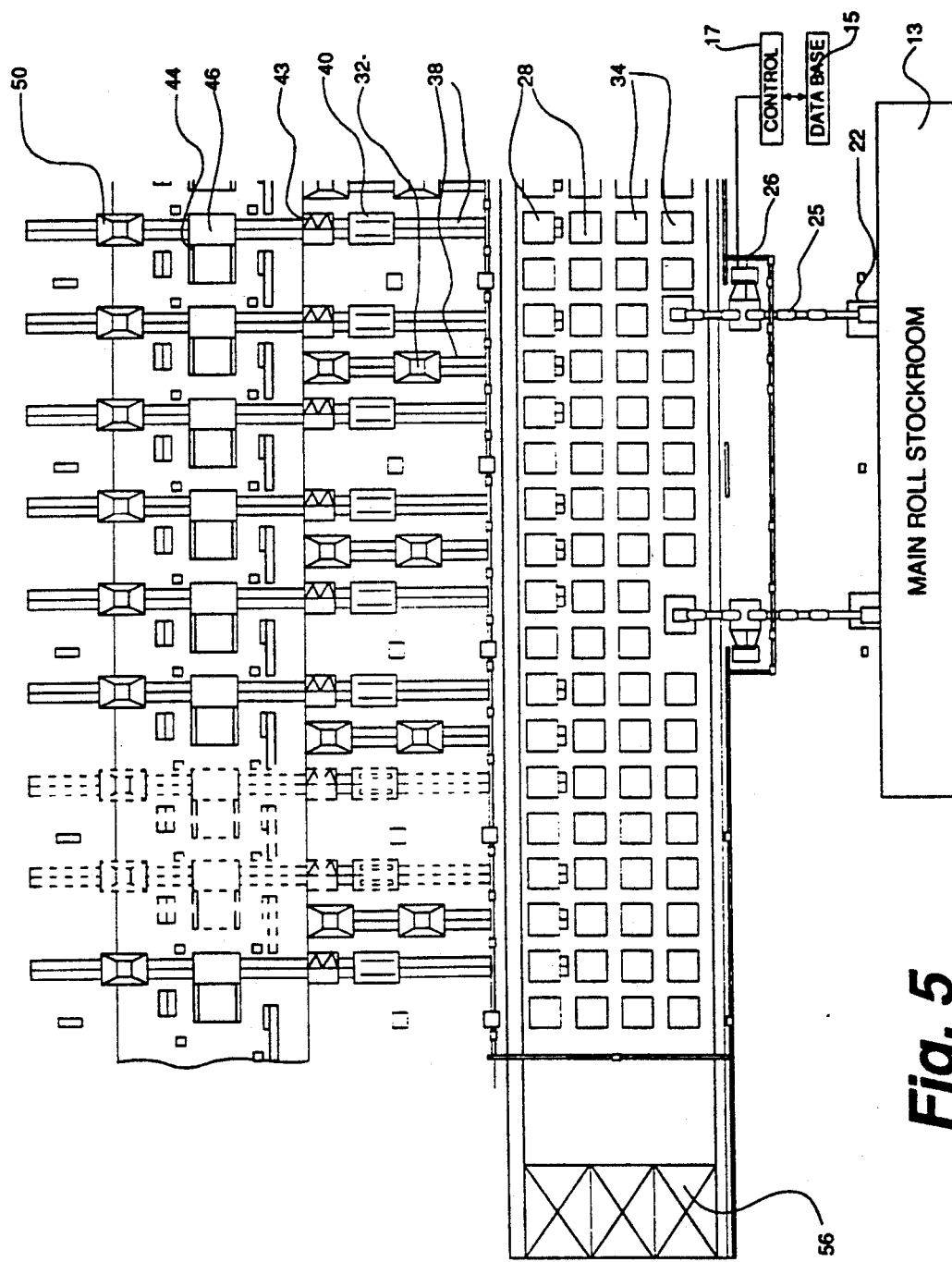
FIG. 5 is a schematic view of another variant of the roll feed room according to FIG. 2.

The roll feed room shown in FIG. 5 for carrying out the process differs from the roll feed rooms shown in FIGS. 2 and by the fact that the roll remnants and the remnant disposal are carried out along the rail section 38 and are transported via the crane 30 to remnant containers 56, from which the entire production waste is collected centrally.

Figure 6:
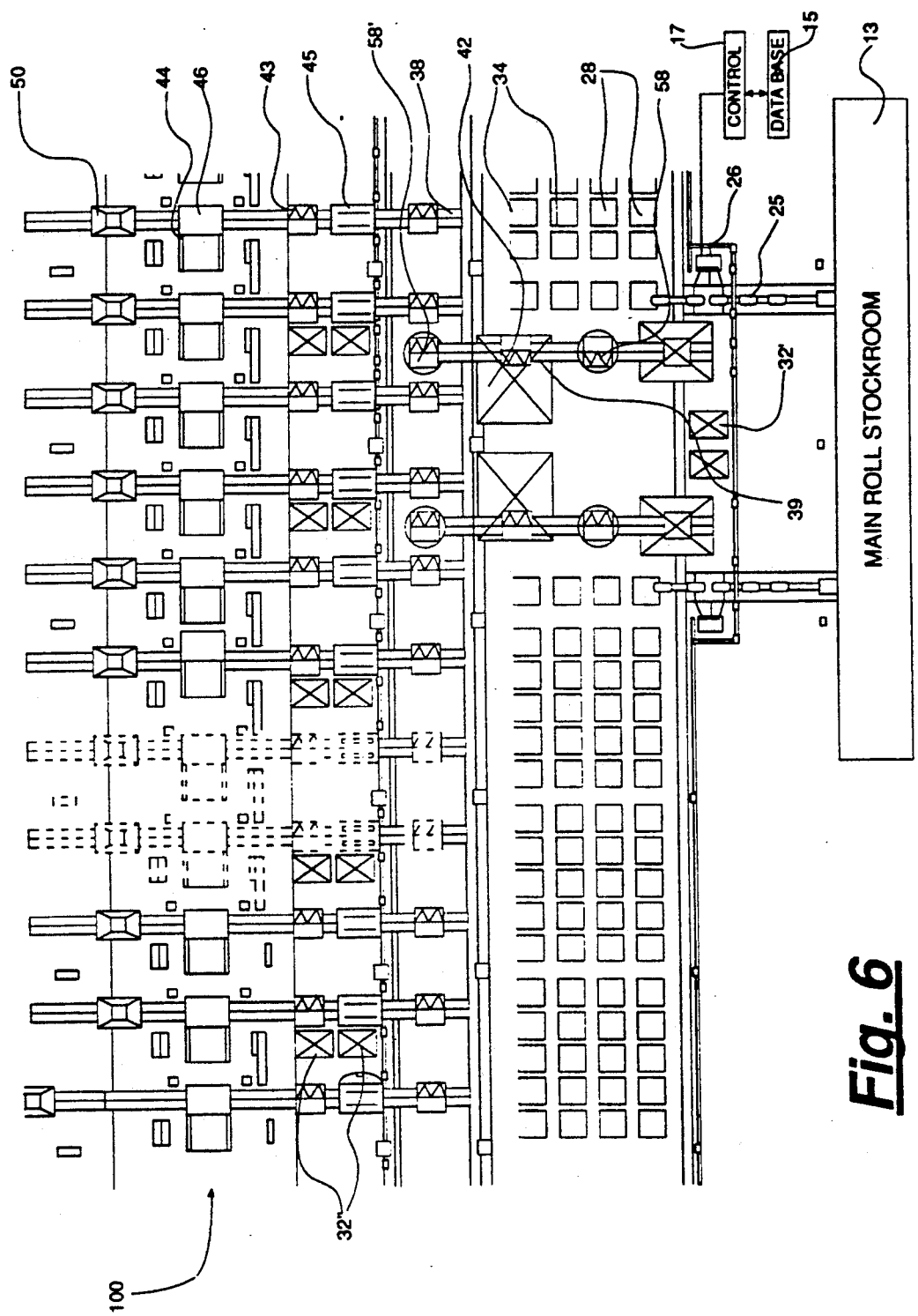
FIG. 6 is a schematic view of a roll feed room for carrying out another preferred process variant.

The fully automatic roll feed room shown in FIG. 6, which is designated as a whole by reference numeral 100, shows the extensively automated variant of the process claimed, comprising automatic unpacking and bonding area preparation units 41 and 42, which are relatively bulky according to the state of the art.

The route of the paper rolls 28 in the fully automatic roll feed room 100 again begins at the feed station 22

Figure 8:
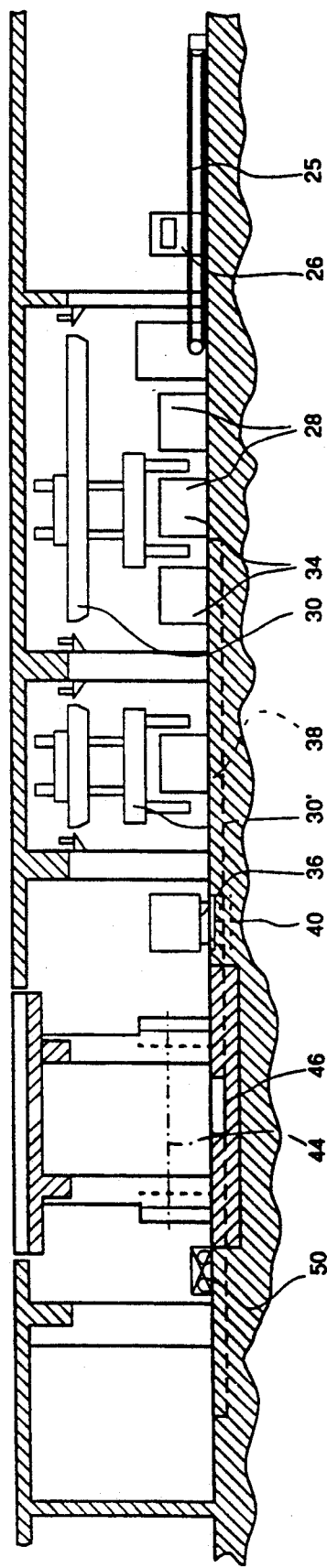

(not shown here) with the stacker truck. The paper rolls are placed there onto the conveyor belt 25, by which the paper rolls are conveyed past the bar code reader 26 and into the action zone of the crane 30 (as is shown in FIG. 8). The crane deposits the paper rolls 28 at predetermined unloading sites 34.

If necessary, the paper rolls 28 are conveyed to a transfer station 58, from which the paper rolls are transported on the roll carts 36 to a fully automatic unpacking station 41. Here, the paper rolls 28 are unpacked automatically. The remnants thus generated are deposited in the containers of a disposal station 32'.

The paper roll 28 thus prepared is now conveyed to an automatic bonding area preparation unit 42 via a rail section 39, past a deposition area 58. Damaged white paper is removed from the paper roll here, and the bonding area is prepared for bonding. The paper rolls 28 are now prepared to the extent that they are ready to be placed into the roll stands 44 and are now conveyed via an extension of the rail section 39 to a transfer station 58', where they are located in the work zone of the crane 30', which is shown in FIG. 8.

The crane 30' transports the paper rolls to the desired rail sections 38, where the paper rolls are deposited on the roll carts 36. The roll carts 36 bring the paper rolls 28 to the roll stands 44 and consequently to the lifting devices 46 via rail sections 8, past an emergency unpacking and bonding area preparation station 45. The emergency stations 45 are needed only when the corresponding automatic units fail. Remnants generated here are deposited in traveling disposal stations 32''. The mode of operation, the process in the area of the roll stands 44 and of the lifting devices 46, as well as of the roll remnant disposal stations 50 correspond to the roll feed rooms shown in FIGS. 2 and 3.

The prepared rolls 28 can be returned from the bonding area preparation station 42 to the transfer station 58 and be transferred from there onto the rail sections 38 with the crane 30. This design variant eliminates the need for the crane 30', but is associated with reduced roll processing capacity, because the removal and feeding operations cannot overlap in time.

Figure 7:
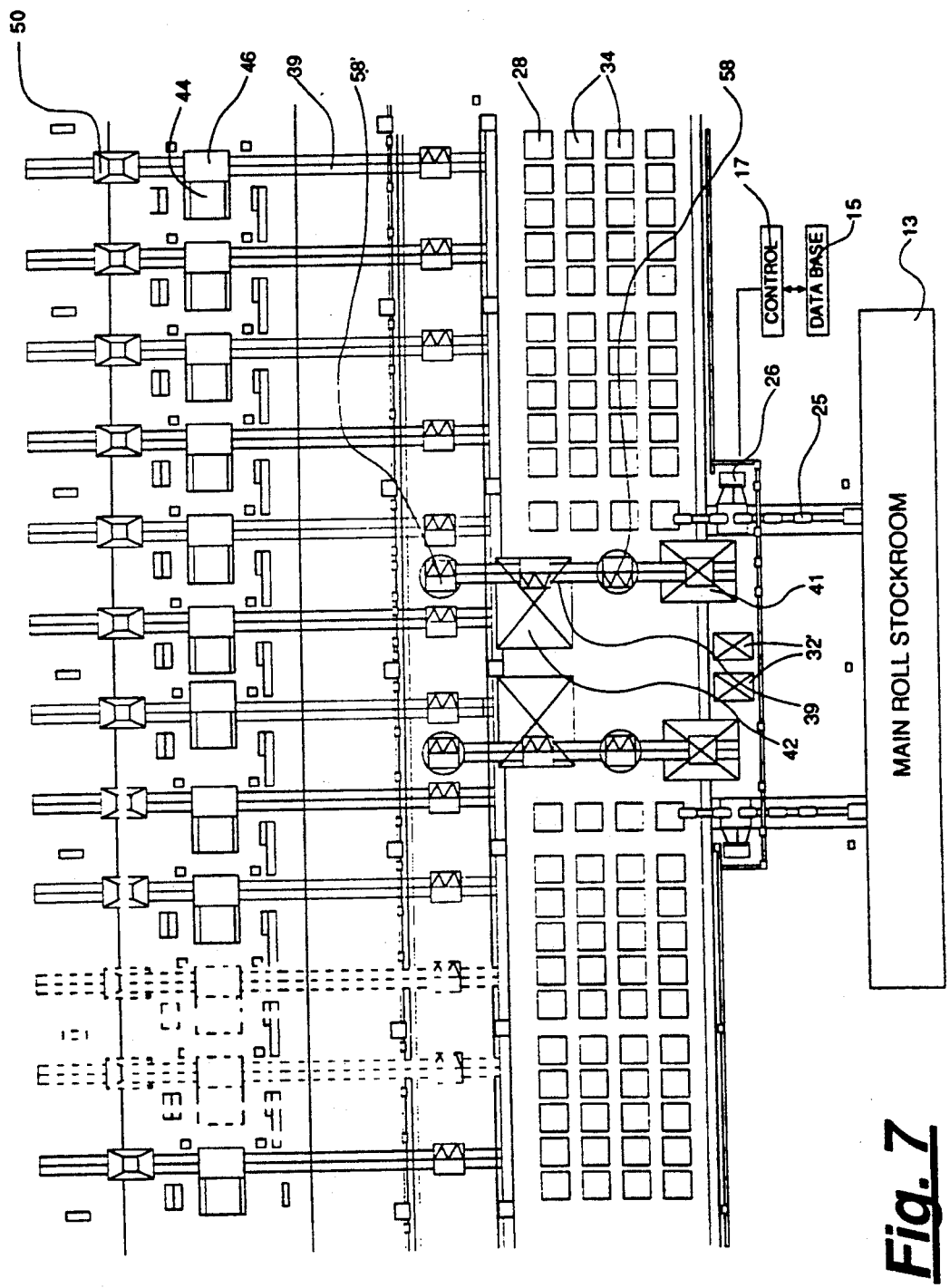
FIG. 7 is a schematic view of a modification of the roll feed room for the process variant according to FIG. 6; and, FIG. 8 is a sectional view through the roll feed room according to FIG. 6.

The modification of the roll feed room according to FIG. 6 for carrying out a process variant, which is shown in FIGS. 7 and 8, contains no emergency unpacking and bonding area preparation stations and the corresponding disposal stations, because the automatic unpacking and bonding area preparation units 41/42 have the necessary redundancy. The roll stands 44 as well as the lifting devices 46 and the roll remnant disposal stations 50 operate as described above.

The automatic control or roll feed system, which controls the supply of and disposal from the web-fed rotary presses, is an important characteristic of all the above-described variants of the process, as well as all the above- described roll feed rooms 10, 100. At the barcode reader 26, the control system receives information on the type of the paper roll and the type of paper and moves said crane 30 to a predetermined unloading site 34, whose location is stored in its memory, and where said paper roll will remain until used. It is important for each paper roll 28 to be available at any point in time. For redundancy reasons, said control system consists of at least two simultaneously operating, but independent data processing or control units. The basic variant operating according to this process can be gradually upgraded to fully automatic operation without restriction of the continuing production.

While specific embodiments of the invention have been shown and described in detail to illustrate the application of the principles of the invention, it will be understood that the invention may be embodied otherwise without departing from such principles.

What is claimed is:

1. A process for feeding paper rolls to web-fed rotary presses, in which each paper roll is brought from a main roll stockroom used for long-term storage to a roll stand of the web-fed rotary press, comprising the steps of:

providing paper roll sites in an intermediate roll stockroom; conveying paper rolls from the main roll stockroom to the intermediate roll stockroom via a first conveying device to reach a zone of action of a second conveying device; providing said second conveying device in the form of an overhead crane system for freely accessing said paper roll sites; prior to reaching said zone of action of said second conveying device reading information in the form of indicia provided on the paper roll via a data acquisition device for storing data of the paper roll including roll weight, basis weight and paper grade along with coordinates of the site of the intermediate roll stockroom determined for the roll, said site being freely and selectively accessible by said second conveying device;

moving a paper roll from said zone of action by said second conveying device to said determined site of said sites of the intermediate roll stockroom including engaging the paper roll with the crane system at said zone of action, moving the crane system and paper roll above said sites of the intermediate roll stock room to said determined site and depositing the paper roll at said determined site; subsequently transferring the paper roll from the determined site to a roll cart system via said second conveying means including engaging the paper roll with the crane system at said determined site, moving the crane system and the paper roll above said sites of the intermediate roll stock room to said roll cart system and depositing the paper roll in a roll cart of said roll cart system; and, subsequently moving the roll to one of an unpacking and bonding preparation station and a roll stand via said roll cart system.

2. A process according to claim 1, wherein the roll is prepared for bonding and is deposited in the intermediate stockroom at a determined site via at least one of the first and second conveying systems, the roll cart system and the second conveying systems.

3. A process according to claim 1, wherein each roll stand of the web-fed rotary press is provided associated with a non-central unpacking and bonding area preparation station, each of said non-central unpacking and bonding area preparation stations being supplied with paper rolls via the roll cart system.

4. A process according to claim 3, wherein the paper roll preparation and the conveyance of the paper rolls prepared into the intermediate roll stockroom and the roll stands, respectively, are automated as desired.

5. A process according to claim 4, wherein the case of failure of at least one of the second conveying means and the central unpacking ad bonding area preparation stations, the paper rolls are fed directly to the non-central unpacking and bonding area preparation stations and the roll stands respectively and the paper roll preparation is carried out manually.

6. A process according to claim 1, wherein the paper rolls are fed to a centrally arranged unpacking and bonding area preparation station via the roll cart system, said paper rolls being prepared at said unpacking and bonding area preparation station to provide prepared paper rolls which are loaded on the roll cart system and which are brought into a selected roll stand.

7. A process according to claim 1, wherein each unpacking and bonding area preparation station is associated with a disposal station, each disposal station being provided with a corresponding disposal container, each of said disposal containers being fed to a central disposal station via one of said roll cart system and said second conveying means.

8. A process according to claim 1, wherein paper rolls located at one of said roll stands, which can be reused, are returned from the roll stands to one of the intermediate stockroom and the zone adjacent said roll stands via one of said roll carts system and said second conveying means.

9. A system for feeding paper rolls to web-fed rotary presses comprising: a main stock room; an intermediate roll stockroom including a plurality of paper roll sites; a roll stand; roll remnant disposal means including a roll remnant disposal station for disposing of roll remnants; first roll conveying means for conveying rolls between said main roll stock room and said intermediate roll stockroom; unpacking and bonding preparation station; an unpacking and bonding area adjacent said intermediate roll stock room, said unpacking and bonding preparation station being located in said unpacking and bonding area; and a printing press area adjacent said unpacking and bonding area, said roll stand being located in said printing press area; roll cart means extending from said intermediate roll stock room through to said unpacking and bonding area to said roll stand in said printing press area; free access transportation means located in said intermediate roll stock room for transporting a paper roll from said first roll conveying means to a determined site of said plurality of paper roll sites, said free access transportation means moving the paper roll above said sites of said intermediate roll stock room to allow free access to said sites; and, control means including a data acquisition device located adjacent said first roll conveying system for receiving data on the paper roll including weight, paper grade and the position coordinates of the site of the intermediate roll stockroom determined for the roll and for controlling movement of the paper roll.

10. A device according to claim 9, wherein the paper roll conveying system includes at least one overhead crane positioned in the intermediate roll stockroom.

11. A system according to claim 9, wherein said roll cart means includes an unmanner roll cart moveable along rail like tracks forwardly and backwardly between the intermediate roll stockroom and roll remnant disposal stations of said roll remnant disposal system.

12. A system according to claim 9, wherein said control means is redundant including at least two electronic computers thereby allowing one electronic computer to completely take over the control function in the case of malfunction or failure of the other of said electronic computers.

13. A system according to claim 9, wherein travel paths are defined by said roll cart means which are substantially linear.

14. A system according to claim 13, wherein said transportation means includes an overhead crane provided in said intermediate roll stockroom, said roll cart means terminating in said intermediate stockroom, said overhead crane having a zone of action overlapping said roll cart means said overhead crane including means for grasping said rolls at one of the circumference of said rolls via fork type graspers and at the front end of the roll on the roll core via a spindle element, in order not to damage rolls which have been prepared for bonding.

15. A system according to claim 9, wherein said data acquisition device includes at least one barcode reader provided in front of an entrance to the intermediate roll stock room between the main roll stockroom and the intermediate roll stockroom for reading a machine-readable code provided on each paper roll.

16. A system according to claim 9, further comprising an accessible free space zone positioned between said intermediate roll stockroom and said printing zone.

17. A roll feed room for web-fed rotary presses, comprising: a main stock room; an intermediate roll stock room, said intermediate roll stock room having a plurality of paper roll sites arranged in plural columns and plural rows, each paper roll site having individual paper roll site coordinates; an unpacking and bonding preparation room adjacent to said intermediate roll stock room, said unpacking and bonding preparation room including a first unpacking and bonding preparation station and a second unpacking and bonding preparation station; a printing press room adjacent said unpacking and bonding preparation room, said printing room including a first roll stand at a first printing press and a second roll stand at a second printing press; roll cart means for moving a paper roll to one of said unpacking and bonding preparation stations and one of said roll stands including a first rail set extending from a first rail set starting location in said intermediate roll stock room to a first rail set ending location beyond said first roll and with respect to said unpacking and bonding preparation room and a second rail set extending from a second rail set starting location in said intermediate roll stock room to a second rail set ending location beyond said second roll stand with respect to said unpacking and bonding preparation room and a roll cart on said first rail set and a roll cart on said second rail set; stock room paper conveying means for conveying paper rolls from a loading point of said main stock room to a receiving location of said intermediate roll stock room; freely and selectively accessible transport means for freely and selectively moving between said stock room paper conveying means receiving location, each of said paper roll sites in said intermediate roll stock room and said first rail set starting location and said second rail set starting location for engaging a paper roll at said stock room paper roll conveying means receiving location, moving said paper roll above said sites of said intermediate roll stock room to a determined site and depositing the paper roll at said determined sites and engaging the paper roll at said determined site, moving said paper roll above said sites of said intermediate roll stock room to one of said first rail set starting location and said second rail set starting location and depositing the paper roll at said one of said first rail set starting location and said second rail set starting location; control means including a data acquisition device located adjacent said stock room paper roll conveying means for receiving data paper roll including weight, paper grade and position coordinates of said determined site of said sites of the intermediate roll stock room for controlling and monitoring movement of the paper roll.

18. A roll feed room according to claim 17, wherein said roll cart means include a first additional rail set extending from an additional rail set starting location in said intermediate roll stock room to said unpacking and bonding preparation room and including travelling remnant disposal stations positioned on the said rail for moving disposable remnants between said unpacking and bonding preparation zone to said intermediate roll stock room.

19. The roll feed room according to claim 17, further comprising a remnant disposal room, and remnant disposal stations positioned in said remnant disposal room.

* * * * *